Sept. 11, 1934.  B. N. MULFORD  1,973,260
FRUIT SLICING, CORING, OR PITTING MACHINE
Original Filed July 22, 1932  4 Sheets-Sheet 1
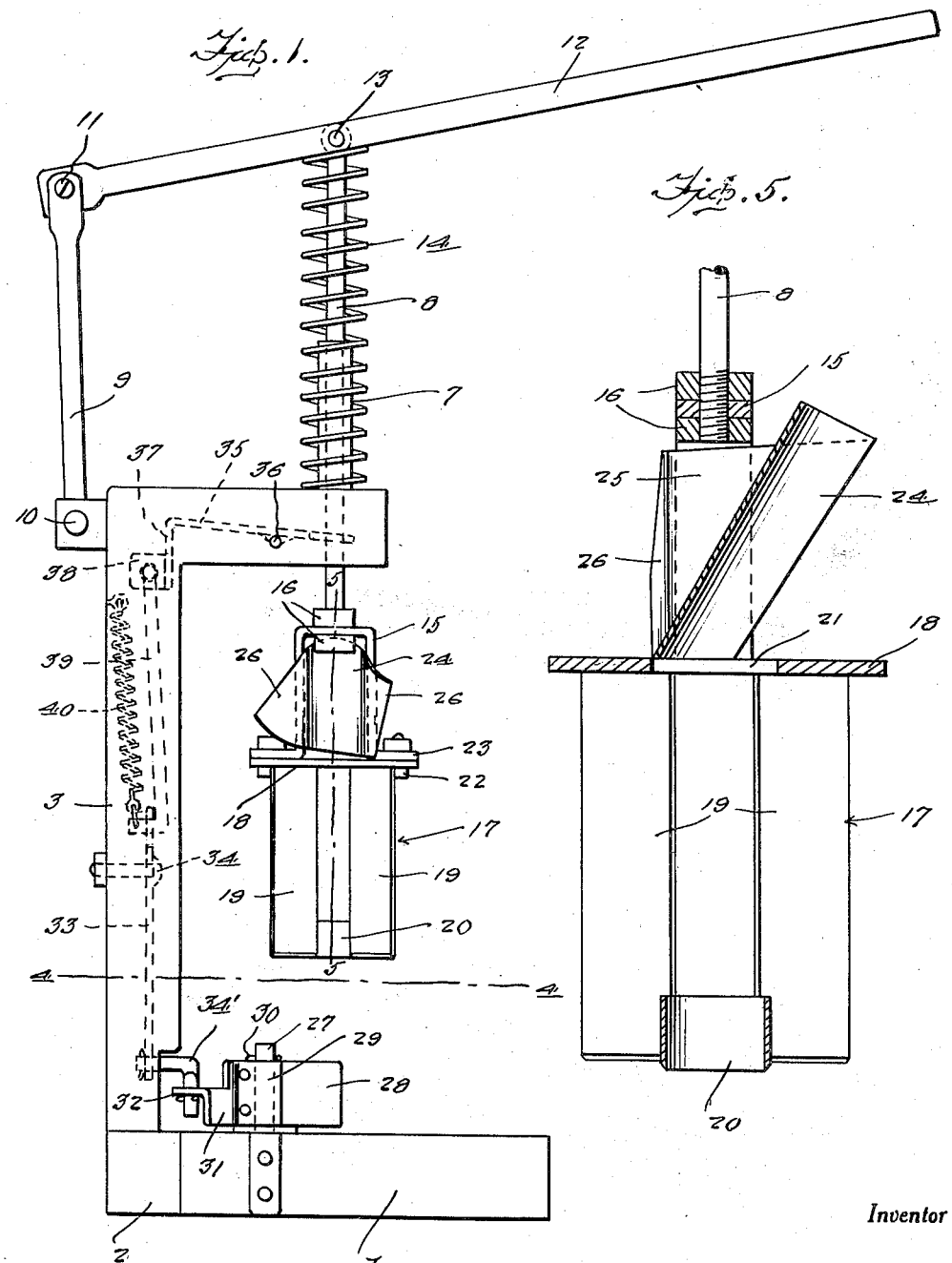
Inventor
B. N. Mulford
By Clarence A. O'Brien
Attorney

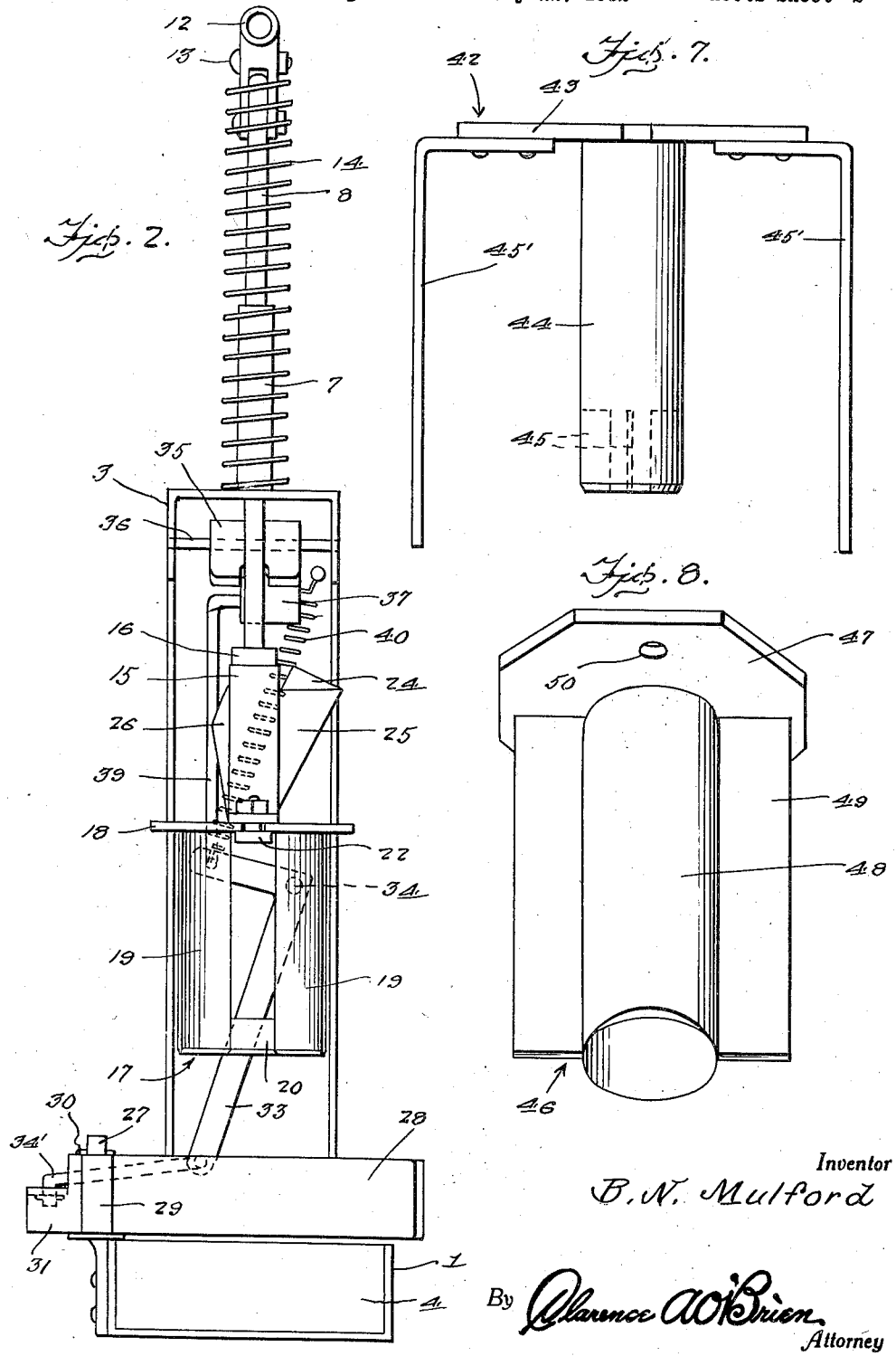

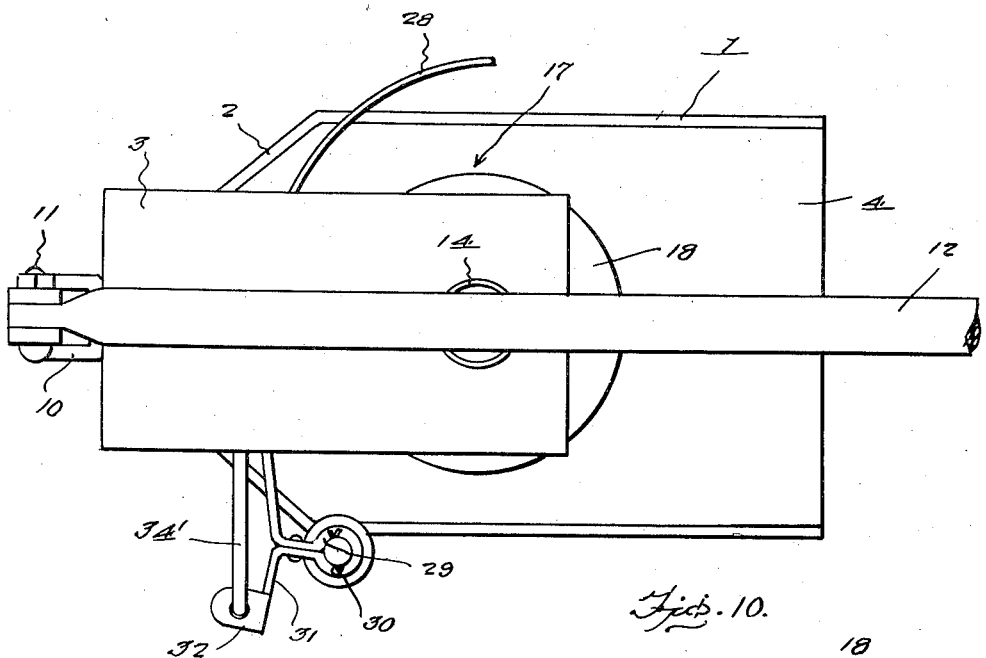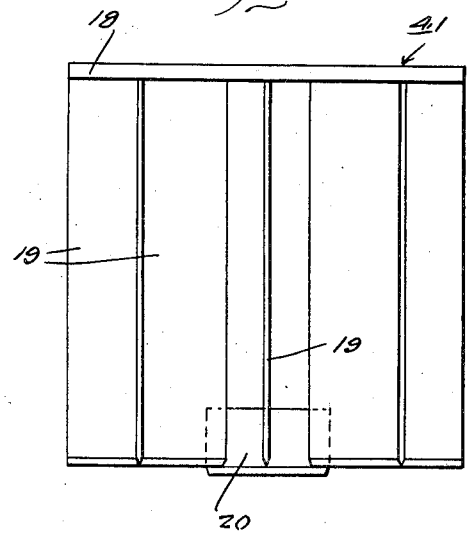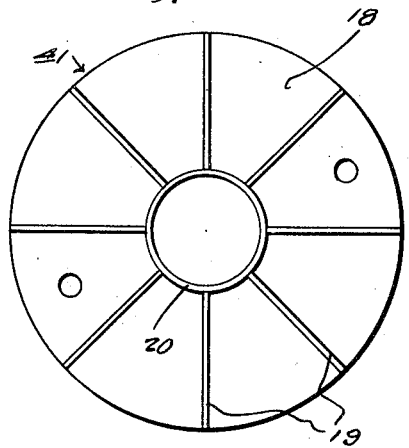

Sept. 11, 1934.  B. N. MULFORD  1,973,260
FRUIT SLICING, CORING, OR PITTING MACHINE
Original Filed July 22, 1932   4 Sheets-Sheet 4
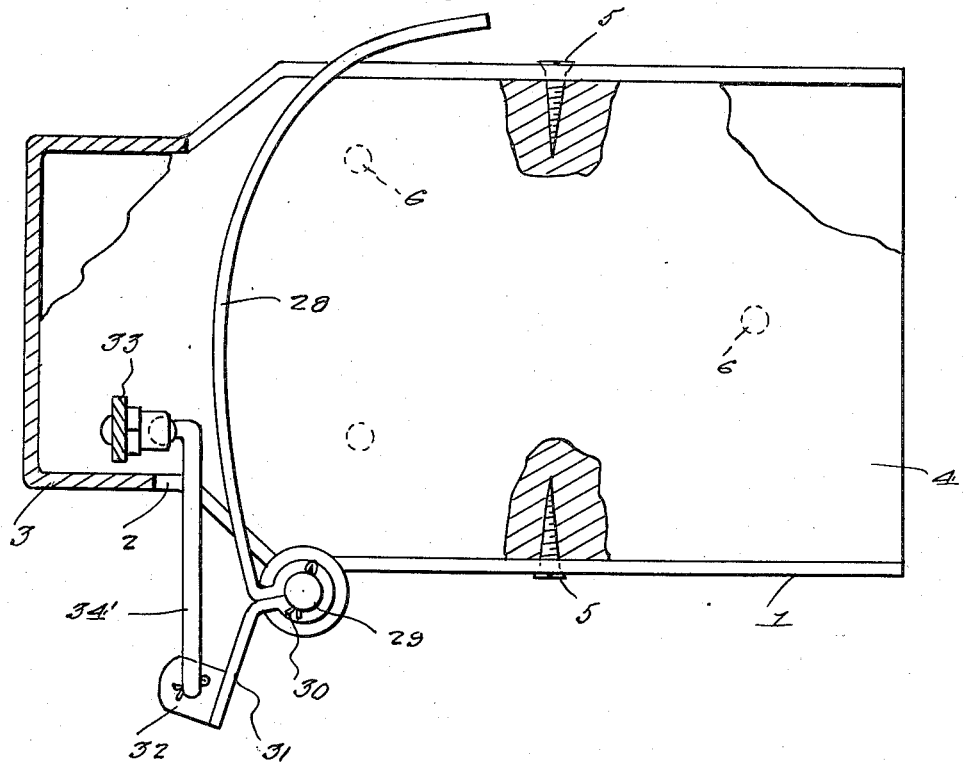
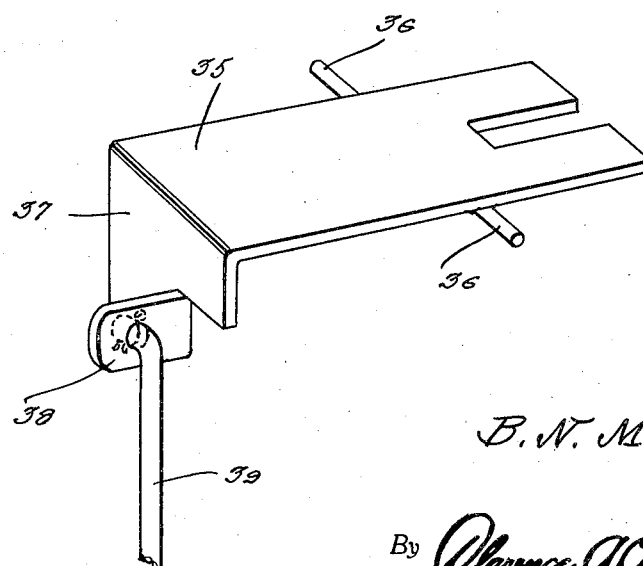
Inventor
B. N. Mulford
By Clarence A. O'Brien
Attorney Patented Sept. 11, 1934

1,973,260

UNITED STATES PATENT OFFICE 1,973,260

FRUIT SLICING, CORING, OR PITTING MACHINE

Braden N. Mulford, Fountain Head, Tenn.

Application July 22, 1932, Serial No. 624,086
Renewed May 5, 1934

2 Claims. (Cl. 146—42)

The present invention relates to new and useful improvements in machines for cutting fruits and vegetables and particularly apples and peaches and has for its primary object to provide, in a manner as hereinafter set forth, a device of this character embodying a novel construction, combination and arrangement of parts through the medium of which apples may be simultaneously sliced and cored or through the medium of which peaches may be simultaneously sliced in halves and pitted.

Another important object of the invention is to provide a fruit slicing, coring or pitting machine of the aforementioned character embodying novel means for sweeping or ejecting the sliced fruit from the path of the cutter after each slicing operation.

Other objects of the invention are to provide a fruit slicing, coring or pitting machine of the character described which will be simple in construction, strong, durable, highly efficient and reliable in operation, light in weight, compact, portable, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a machine constructed in accordance with the present invention.

Figure 2 is a view in front elevation of the machine.

Figure 3 is a view in top plan of the machine.

Figure 4 is a view in horizontal section, taken substantially on the line 4—4 of Figure 1 with portions of the base block broken away.

Figure 5 is a detail view in vertical section, taken substantially on the line 5—5 of Figure 1.

Figure 6 is a detail view in perspective showing one of the levers for actuating the ejector.

Figure 7 is a detail view in side elevation, showing a head to be used for coring apples to be baked.

Figure 8 is a detail view in perspective, showing a head for pitting and slicing into halves cling peaches.

Figure 9 is a detail view in side elevation of an apple slicing and coring head.

Figure 10 is a detail view in bottom plan of the head illustrated in Figure 9.

Referring now to the drawings in detail, it will be seen that the embodiment of the present invention which has been illustrated comprises a base 1 of channel iron having a closed, narrowed rear end portion 2 from which rises an angular standard 3, also of channel iron. The base 1 may be secured on a work table, bench or other suitable support through the medium of anchoring screws or similar elements (not shown). Mounted in the base 1 is a wood block 4 which is detachably secured, as at 5. When it is desired to secure the machine on a support or to remove the machine, the block 4 is removed from the base to permit access to be had to the anchoring screws. The base 1 is provided with a plurality of openings 6 for the anchoring screws.

Rising from an opening in the upper end portion of the standard 3 is a guide 7 in which a rod 8 is mounted for vertical reciprocation. An upstanding link 9 is pivotally mounted, as at 10, at its lower end on the upper portion of the standard 3 and pivotally connected, as at 11, to the upper end of said link 9 is a hand lever 12. The lever 12 is mounted to swing in a vertical plane and has pivotally connected thereto at an intermediate point, as at 13, the upper end of the rod 8. A coil spring 14 encircles the guide 7 and the rod 8 and has one end engaged with the standard 3 and its other end engaged with the lever 12 for yieldingly urging said lever toward inoperative position. If desirable or necessary, a suitable sheath may enclose the coil spring 14 to prevent buckling of said coil spring.

The lower end portion of the rod 8 is threaded and has mounted thereon a yoke 15 which is secured in position by a pair of nuts 16 which are threaded on the rod 8. Removably mounted on the yoke 15 is a cutter head which is designated generally by the reference numeral 17. The head 17 is for slicing and coring apples in particular and comprises a metallic disk 18 from which a plurality of blades 19 depend, said blades 19 being radially disposed relative to each other and spaced from each other. The lower end portions of the blades 19 are rigidly secured to the outer periphery of an annular knife 20. The disk 18 is provided with a central opening 21 which is alined with the annular knife 20 and the vertical passage defined by the blades 19. The disk 18 is further provided with openings for the passage of securing bolts 22 for detachably connecting said disk to the out-turned feet 23 on the ends of the yoke 15.

Removably mounted in the yoke 15 is an inclined core deflecting guide 24 having its lower end communicating with the opening 21 in the disk 18. The guide 24 is preferably of resilient sheet metal and includes a pair of side flanges 25 engaged in the yoke 15, said flanges terminating in outwardly curved free end portions 26 for retaining the guide in position. This is illustrated to advantage in Figures 1 and 5 of the drawings.

Secured on one side of the base 1 and rising therefrom is a pin 27 upon which an ejector 28 is mounted for swinging movement in a horizontal plane across the block 4. The ejector 28 is longitudinally curved and has an intermediate portion bent to form a loop or eye 29 which is journaled on the pin 27. A cotter pin 30 retains the ejector 28 on the pin 27. From the loop or eye 29 on its pivoted end, the material from which the ejector 28 is formed extends to provide an arm 31 having an integral, apertured ear 32 on its free end portion.

A bell crank lever 33 is pivotally mounted, as at 34, for swinging movement in the lower portion of the standard 3 and has its lower end connected to the arm 31 of the ejector 28 by a link 34', said link being engaged with the apertured ear 32. Mounted for swinging movement in a vertical plane in the horizontally extending upper portion of the standard 3 is a bifurcated lever 35 which straddles the rod 8. The lever 35 is provided with trunnions 36 at an intermediate point which are journaled in openings provided therefor in the sides of the standard 3. The lever 35 includes a downturned end portion 37 from which an apertured ear 38 extends. A link 39 operatively connects the bell crank lever 33 to the lever 35. The link 39 has one end connected to the ear 38 and its other end engaged in an opening provided therefor in the upper end portion of the bell crank lever 33. A coil spring 40 has one end anchored in the standard 3 and its other end connected to the lower end of the link 39, said spring constituting means for returning the ejector 28 to inoperative or retracted position. The spring 40 also constitutes means for preventing detachment of the lower end of the link 39 from the bell crank lever 33.

In operation, the ejector 28 is normally in retracted position, as shown in Figures 1 and 4 of the drawings. The apple is positioned on the wood block 4 beneath the cutter head 17. It will be noted that the coil spring 14 raises the cutter head 17 sufficiently to provide ample room for positioning the apple on the block 4. After the apple has been so placed, the lever 12 is swung downwardly against the tension of the coil spring 14 to drive the cutter head 17 downwardly through the apple, the annular knife 20 coring the apple and the blades 19 slicing or segmenting said apple. When the lever 12 is released, the spring 14 will again raise the cutter head 17 to inoperative position. Continued manual lifting of the lever 12 raises the rod 18 until the uppermost nut 16 engages the bifurcations on one end of the lever 35 for actuating said lever 35. Thus, the ejector 28 is actuated against the tension of the coil spring 40 to sweep the sliced fruit from the block 4. A suitable chute or receptacle (not shown) may be provided for receiving the sliced fruit from the block 4. When the lever 12 is lowered, the coil spring 40 returns the ejector 28 to retracted position.

As successive apples are cored, the cores are forced upwardly through the opening 21 in the disk 18 of the cutter head 17 and are directed outwardly by the inclined guide 24. The length of the spring 14 is such that the lever 12 will not be raised sufficiently by said spring to actuate the lever 35. The cutter head 17, as illustrated, includes four blades 19. However, as many of the blades 19 as desired may be provided. For example, in Figures 9 and 10 there is illustrated a cutter head which is designed generally by the reference numeral 41 and which includes eight slicing blades. Otherwise, the head 41 is substantially similar to the head 17.

In Figure 7 of the drawings, there is illustrated a head which is particularly designed for coring apples to be baked. This head is designated generally by the reference numeral 42 and comprises a plate 43 for attachment to the feet 23 of the yoke 15, said plate 43 having suitable openings therein for the passage of the securing bolts 22. The head 42 further includes a tubular knife 44 which depends from the plate 43 and which communicates with a central opening provided in said plate for the passage of the cores. Mounted in the lower end portion of the tubular knife 44 are radial blades 45 which constitute means for retaining the cores in the tubular knife. Mounted on the lower side of the plate 43 are gage arms 45' which extend on opposite sides of the tubular knife 44.

In the use of the head 42 the gage arms 45' engage the block 4 and prevent the tubular coring knife 44 from being driven all the way through the apple, thus leaving sufficient meat and the skin on the lower side of the apple to provide a bottom for the bore which has been formed in the cored fruit in order that sugar, etc. that may be placed in the baked apple will be retained. The blades 45 constitute lugs which are engaged with the core in the tubular knife 44 for pulling or detaching the cut or severed portion of the core from the uncut portion thereof, or that portion which is to be left in the apple.

In Figure 8 of the drawings, there is illustrated a head which is designed particularly for pitting and slicing into halves, cling peaches. This head is designated generally by the reference numeral 46 and comprises a plate 47 to be detachably mounted on the yoke 15. Depending from the plate 47 is a tubular knife 48 from diametrically opposite sides of which blades 49 extend. The upper ends of the blades 49 are also secured to the lower side of the plate 47. The plate 47 of the head 46 is provided with openings 50 for the passage of the securing bolts 22.

It is believed that the many advantages of a machine constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A cutting machine of the class described comprising a base, a standard having its lower end connected with the base and a horizontal part at its upper end, a rod passing through the horizontal part and having sliding movement therein, a cutter connected with the lower end of the rod, a lever having an intermediate portion pivotally connected with the upper end of the rod, means pivotally connecting one end of the lever to the standard, spring means for normally holding the lever in a position with the cutter spaced an appreciable distance from the base to permit an article to be placed on the base under the cutter, an ejector member pivotally mounted on the base for swinging movement for removing the fruit or articles from said base after the same has been cut, and means for moving the ejector to remove the cut articles from the base, by an upward movement of the lever above the point where said lever is moved by the spring means.

2. A cutting machine of the class described comprising a base, a standard mounted on the base and having a horizontal part, a rod passing through said horizontal part, a cutter attached to the lower end of the rod for cutting fruits or articles placed on the base, a lever pivotally supported from the standard and connected at an intermediate part to the upper end of the rod, spring means for partly raising the lever to hold the cutter in spaced relation from the base, a second lever pivoted to the horizontal part of the standard and having one end located adjacent the rod, a projection on the rod for engaging said end to tilt the second lever when the first lever is moved upwardly above the point where said lever is raised by the spring means, an ejector member pivotally mounted on the base for swinging movement for removing the fruit from said base, a bell crank connected to a part of the standard, a link connecting the lower end of the bell crank to the ejector member, a second link connecting the upper end of the bell crank to the second lever whereby movement of said second lever will swing the ejector member across the base to remove the cut fruit therefrom, and spring means for normally holding the ejector member in inoperative position.

BRADEN N. MULFORD.